United States Patent
Kim et al.

(10) Patent No.: US 8,330,797 B2
(45) Date of Patent: Dec. 11, 2012

(54) METHOD FOR PHOTOGRAPHING PANORAMIC PICTURE WITH PRE-SET THRESHOLD FOR ACTUAL RANGE DISTANCE

(75) Inventors: Soo-Kyun Kim, Seoul (KR); Jae-Won Moon, Bucheon-si (KR); Sung-Dae Cho, Yongin-si (KR); Yun-Je Oh, Yongin-si (KR); Hee-Won Jung, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 935 days.

(21) Appl. No.: 12/231,077

(22) Filed: Aug. 29, 2008

(65) Prior Publication Data

US 2009/0058990 A1 Mar. 5, 2009

(30) Foreign Application Priority Data

Aug. 29, 2007 (KR) .................. 10-2007-0087087

(51) Int. Cl.
*H04N 7/00* (2006.01)
(52) U.S. Cl. ............... 348/36; 348/E5.024; 348/E7.001; 348/207.99; 382/284
(58) Field of Classification Search .................. 348/36, 348/207, 207.99, E05.024, E07.001; 382/284
See application file for complete search history.

(56) References Cited

U.S. PATENT DOCUMENTS

| 5,689,611 | A | | 11/1997 | Ohta et al. ....................... 386/46 |
| 6,157,747 | A | | 12/2000 | Szeliski et al. ................. 382/284 |
| 6,618,511 | B1 | | 9/2003 | Mancuso et al. ............. 382/293 |
| 6,717,608 | B1 | * | 4/2004 | Mancuso et al. ................ 348/36 |
| 6,930,703 | B1 | * | 8/2005 | Hubel et al. ..................... 348/37 |
| 7,072,398 | B2 | * | 7/2006 | Ma ............................ 375/240.16 |
| 8,077,208 | B2 | * | 12/2011 | Ahonen ................... 348/207.99 |
| 8,160,149 | B2 | * | 4/2012 | Demos ..................... 375/240.16 |
| 2004/0189849 | A1 | * | 9/2004 | Hofer ....................... 348/333.03 |
| 2004/0190613 | A1 | * | 9/2004 | Zhu et al. ................. 375/240.12 |
| 2004/0258154 | A1 | * | 12/2004 | Liu et al. .................. 375/240.16 |
| 2005/0099494 | A1 | * | 5/2005 | Deng et al. ...................... 348/36 |
| 2006/0050152 | A1 | * | 3/2006 | Rai et al. ..................... 348/218.1 |
| 2007/0081081 | A1 | * | 4/2007 | Cheng ........................ 348/218.1 |
| 2007/0085913 | A1 | * | 4/2007 | Ketelaars et al. ............. 348/239 |
| 2007/0129853 | A1 | * | 6/2007 | Greenfeld et al. ................ 701/3 |
| 2007/0138284 | A1 | * | 6/2007 | Giordano et al. ............. 235/454 |

(Continued)

FOREIGN PATENT DOCUMENTS

| EP | 0810776 | 12/1997 |
| KR | 2005-13861 | 2/2005 |

*Primary Examiner* — Alina N. Boutah
(74) *Attorney, Agent, or Firm* — Cha & Reiter, LLC

(57) ABSTRACT

A method for photographing a panoramic picture includes the steps of checking motion of a corresponding photographing apparatus compares currently input images and previous images in real time through a motion estimation technique employing exposure compensation. Respective images constituting a panoramic picture are photographed, and image photography information is checked that includes focus distance and optical magnification to calculate actual photography range distance of the images. A pre-set threshold is set in consideration of a calculated actual photography range distance of the images. The checked motion is confirmed as to whether the pre-set threshold has been reached, and photography time points of the respective images are determined. The respective images are photographed according to a manual mode or an automatic mode at the photography time point of the respective images.

17 Claims, 11 Drawing Sheets

(5 of 11 Drawing Sheet(s) Filed in Color)

U.S. PATENT DOCUMENTS

| | | | |
|---|---|---|---|
| 2007/0147812 A1* | 6/2007 | Nenonen et al. | 396/20 |
| 2007/0248330 A1* | 10/2007 | Pillman et al. | 386/107 |
| 2007/0263995 A1* | 11/2007 | Park et al. | 396/50 |
| 2008/0158342 A1* | 7/2008 | Jeong et al. | 348/36 |
| 2008/0226192 A1* | 9/2008 | Silverstein et al. | 382/276 |
| 2008/0252717 A1* | 10/2008 | Moon et al. | 348/36 |

* cited by examiner

METHOD FOR PHOTOGRAPHING PANORAMIC PICTURE WITH PRE-SET THRESHOLD FOR ACTUAL RANGE DISTANCE

CLAIM OF PRIORITY

This application claims the benefit of priority under 35 U.S.C. §119(a) of an application entitled "Method For Photographing Panoramic Picture" filed in the Korean Intellectual Property Office on Aug. 29, 2007 and assigned Serial No. 2007-0087087, the contents of which are hereby incorporated by reference in its entirety.

CROSS REFERENCE TO RELATED APPLICATIONS

This application is related to U.S. application Ser. No. 12/199,007, filed Aug. 27, 2008, entitled Method for photographing Panoramic image Picture, based on and claiming priority from Korean Priority application 2007-0086105, filed Aug. 27, 2007.

BACKGROUND OF THE INVENTION

1. Field of the Invention

The present invention relates to digital image photography in diverse complex apparatuses having a function of photographing a digital image, including digital cameras and mobile terminals equipped with camera modules. More particularly, the present invention relates to a method for photographing a panoramic picture.

2. Description of the Related Art

Conventionally, an image capture unit functions to obtain an image in a digital image photographing apparatus, and the image is formed within a focal length of a lens thereof. Here, the obtained image is within a range of the typical viewing angle (between about 30° to 50° for general cameras), which is smaller than the human visual angle (between about 150° to 200°). In a conventional method of photographing multiple images while properly changing the viewing angle, the photographed images are inter-connected in sequence to reorganize them into one consecutive image. Therefore a picture is obtained with a viewing angle similar to or larger than the human visual angle. Such a conventional method is called a panoramic picture photographing method.

More particularly, in a panoramic picture photographing mode, the conventional digital image photographing apparatus photographs several images to be inter-connected horizontally or vertically, and then stores them in a memory. The images stored in the memory are provided to an appropriate interior/exterior image processor later, and are inter-connected into one consecutive image. At this time, in order to eliminate color differences and image discords at the boundaries between the images, digital image photographing apparatuses photograph multiple images with sufficient overlap between their boundaries, and then align the images by adjusting their boundaries. Thereafter, they perform image processing, including stitching and bending. Through this process, a single image is obtained that includes naturally inter-connected multiple images.

Panoramic picture photography therefore places a high priority on the capture of such images aligned as accurately as possible. To this end, an accessory apparatus, such as a tripod, is normally used in such manual photography to increase the likelihood of more accurate alignment. For example, a recent method has been suggested in which a corresponding photographing apparatus is mounted on a tripod or the like, and the mounted photographing apparatus is rotated according to respective images in panorama photographing. An example of such a method is disclosed in Korean Patent Application No. 2003-0052444 filed on Jul. 29, 2003, entitled "Camera And Method for Photographing Panorama Picture", the applicant of which is Samsung Techwin Co. Ltd., and the inventor of which is BAE, Sung-cheol. Further to the above-described methods, an apparatus having a function of detecting a rotation angle may be additionally mounted on the corresponding photographing apparatus, and a user sets the rotation angle of the photographing apparatus in advance so that the respective images are photographed by rotational displacement over the rotation angle of the photographing apparatus pre-set by the user in panorama photographing, of which method has been also suggested.

Furthermore, in order to align the respective images more accurately in case of photographing of panoramic pictures (without mounting an accessory element or additional hardware on the corresponding photographing apparatus), the method has been provided in which the partial region of the border of previously photographed image is represented appropriately overlapping with the current image for photographing when photographing respective images, so that the user can control an appropriate position for photographing by adjusting the pre-photographed image with the current photographing image. An example of such the method is disclosed in US Publication No. 2004/0189849 filed on Mar. 31, 2003, entitled "Panoramic Sequence Guide" in the name of an inventor, Gregory V. Hofer.

Photographing panoramic pictures requires more user-sophistication and proficiency vis-a-vis photographing a general single image, and this has necessitated better and more convenient solutions for manipulating and photographing images.

SUMMARY OF THE INVENTION

Accordingly, the present invention provides a method for photographing a panoramic picture, in which a user can manipulate a photographing apparatus more easily and photograph the panoramic picture more accurately without additional apparatus and hardware.

The present invention aims at providing a method for confirming movement of a camera more accurately and using the checked movement of the camera in photographing a panoramic picture.

Accordingly, the present invention proposes a new motion estimation technique for employing exposure compensation in consideration of the specific environment of a camera being used to photograph, so as to recognize the motion between previous frames and current frames of the input image by using image blocks in a predetermined range. That is, the present invention employs a new motion estimation scheme, instead of the conventional motion estimation scheme. In this case, since calculation during photography must be quickly conducted such that motion vectors are calculated and simultaneously a preview normally operates, an integral image can be used to reduce its calculation amount. Additionally, a reference block used to find a motion vector is variably adjusted based on possible preview speed, and the size or distance of a photographed object, and the preview image features relatively low correlation in comparison with the compression image, so that a single block search scheme can be used to maximize its correlation. In general, when the motion estimation between frames is conducted, a plane image may be employed. However, in view of the extraordinary nature of the circumstance where the panoramic picture is photographed, the motion estimation for the image pre-projected on the cylindrical panorama projection space may be conducted.

In accordance with an exemplary aspect of the present invention, there is provided a method for photographing a panoramic picture, the method including the steps of: checking motion of a corresponding photographing apparatus by comparing currently input images and previous images in real time through a motion estimation technique employing exposure compensation, when respective images constituting a panoramic picture are photographed; checking image photography information including focus distance from a subject and optical magnification to calculate actual photography range distance of the images, and setting a pre-set threshold in consideration of the calculated actual photography range distance of the images; confirming that the checked motion, caused by movement of the photographing apparatus, reaches the pre-set threshold, and determining photography time points of the respective images; and photographing the respective images according to a manual mode or an automatic mode at the photography time point of the respective images.

Preferably, the motion estimation technique may include a technique for calculating motion vectors between image blocks matched based on error information between respective pixels compared among the image blocks of frames, and correcting the respective pixels in the image blocks according to an average value of a corresponding image block and employing the exposure compensation.

The error information can be acquired, for example, by calculation of a Sum of Squared Difference (SAD) or a Sum of Absolute Difference defined by the following equations:

modified SAD
$$E'(m, n) = \sum_{x,y \in block} |I_1(x, y) - \overline{I_1} - (I_2(x+m, y+n) - \overline{I_2}(m, n))|$$

modified SSD
$$E(m, n) = \sum_{x,y \in block} \{I_1(x, y) - \overline{I_1} - (I_2(x+m, y+n) - \overline{I_2}(m, n))\}^2$$

In the equations, $I_1$ and $I_2$ are pixel values of (x, y) and (x+m, y+n) in the image blocks within the current frame and the previous frame, respectively, $\overline{I_1}$ and $\overline{I_2}$ are average values of pixels corresponding to blocks within the previous frame and the current frame, respectively.

When the average value of the pixel is calculated, an integral image for the current frame may be set in advance, and average values of the respective image blocks may be calculated by using the integral image. The pixel value may correspond to brightness or respective color tones.

Preferably, the image block may be variably set according to preview performance and/or a distance from the subject, and/or photography mode information, and the SR for searching blocks matched with the image blocks may be variably set.

According to the present invention, the frames may be subjected to the motion estimation by projecting the frames on a pre-set panoramic projection space in advance, and the frames may be skipped in a pre-set manner when the frames are compared.

With regard to the step of checking the motion of the photographing apparatus, a direction toward which the photographing apparatus is moved is recognized, and the photographing apparatus is guided to move from the recognized direction to a pre-set panoramic picture photography direction by using a guiding device.

The guiding device may correspond to a User Interface (UI) on which a guiding direction is displayed by a display, and correspond to a vibrant motor driven at the time point of the pre-set photography position.

According to the present invention, the method may further include the steps of: checking image photography information including the distance from the subject and the optical magnification, calculating the actual photography range distance of the images by using the image photography image, and setting the pre-set threshold in consideration of the actual photography range distance of the images, before the photography time point of the respective images is determined.

The pre-set threshold may, for example, correspond to a value indicating a time point for photographing respective images and/or a time point when a photography time point is reached.

Preferably, the pre-set threshold for indicating the time point when the photography time point is reached can be set, for example, by reflecting photography patterns including a camera movement speed, a rotation angle, and a degree where the camera is shaken, while a user photographs a panoramic picture.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other exemplary aspects, features and advantages of the present invention will be more apparent from the following detailed description taken in conjunction with the accompanying drawings, in which.

DETAILED DESCRIPTION

Hereinafter, one exemplary embodiment according to the present invention will be described with reference to the accompanying drawings. In the description below, many particular items such as a detailed component apparatus are shown, but these are given only for providing the general understanding of the present invention, it will be understood by those skilled in the art that the present invention.

Figure 1:
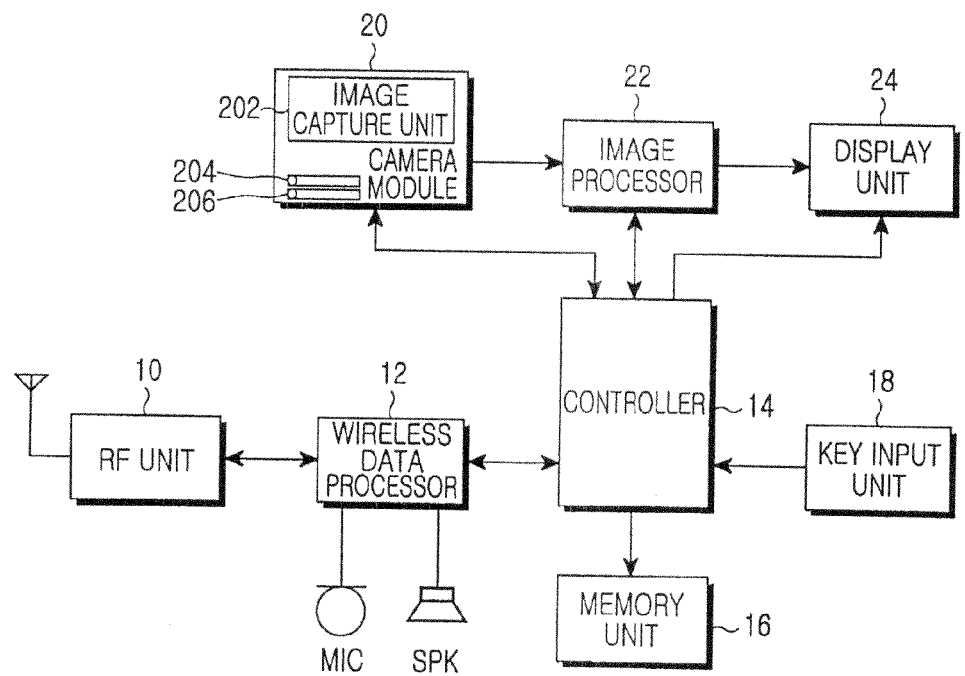
FIG. 1 is an exemplary block diagram illustrating a mobile terminal according to the present invention.

FIG. 1 is an exemplary block diagram of one possible arrangement of a mobile terminal according to the present invention. Hereinafter, among diverse apparatuses having a function of digital image photography, a hardware-based apparatus will be first-described with an example of the mobile terminal as shown in FIG. 1.

Referring to FIG. 1, the mobile terminal having the function of digital image photographing according to the present invention includes a camera 20, an image processor 22, a display unit 24, as well as a controller 14, a memory unit 16, a key input unit 18, a Radio Frequency (RF) unit 10, and a wireless data processor 12.

The RF unit 10 modulates user voice, text messages and control data into wireless signals, and transmits the modulated signals to a base station (not shown) of a mobile radio communications network. The RF unit 10 also receives the wireless signals from the base station, and then demodulates them into a voice, text messages, control data or the like, to output. The wireless data processor 12 operates under the control of the controller 14. The wireless data processor 12 decodes voice data received from the RF unit 10 to output an audible sound via a speaker, and generates data including the user voice signal received from a microphone to output to the RF unit 10. Then, the wireless data processor 12 supplies text messages and control data input via the RF unit 10 to the controller 14.

Still referring to FIG. 1, the camera 20 performs a general digital camera function under the control of the controller 14, and receives visible ray signals of a specific wavelength reflected from a subject. The camera 20 includes the image capture unit 202 formed with a charge-coupled device (CCD) photographing device or the like, as well as a luminance sensor 204 for measuring luminance and a distance sensor 206 for measuring a focus distance from a subject or the like. The image processor 22 processes image data output from the camera 20 to convert the processed data into digital image data of a suitable format.

The key input unit 18 receives a telephone number or text messages from the user includes a plurality of keys for inputting numbers and text message information and a plurality of function keys for setting diverse functions, and outputs their input signals to the controller 14. The display unit 24 can be formed with the display devices, such as, for example, a liquid crystal display (LCD), and displays the photographed digital image data including the messages corresponding to various operating states of the corresponding mobile terminal under the control of the controller 14.

The controller 14 controls the general operation of a mobile communications terminal through general control of the respective function units. That is, the controller 14 performs a process according to the number and menu selecting signals input via the key input unit 18, receives an external photographing signal via the camera 20 to process correspondingly, and then, outputs the images photographed by the camera as well as the image output signals necessary for diverse operations through the display unit 24. At this time, the controllers 14 brings contexts for output stored in the memory unit 16 or stores the contexts in the memory unit 16. The memory unit 16 stores a plurality of programs and data related to the operation of the controller 14, and is used for storing information required for manipulating the mobile terminal and camera photographing image information.

The mobile terminal equipped with configurations according to the present invention, performs, for example, a function of the camera as well as operations relating to, for example, conventional mobile communications services, at this time, the controller 14 performs the operation of panoramic picture photography according to characteristics of the present invention as well. Further, the memory unit 16 stores the operating program and relative information for the operation of panoramic picture photography in the controller 14, and outputs the corresponding information to the controller 16 where necessary, according to the present invention.

Especially, when the mobile terminal according to the present invention receives the image of the subject like a moving picture in real-time, and is moved by the user according to the photographing direction of the panoramic picture or by an additional apparatus equipped with the corresponding the mobile terminal and rotates automatically as well in case of photographing the panoramic picture, the mobile terminal compares the current input image with the previous image to detect the motion of the corresponding mobile terminal, and recognizes the direction of motion and the degree of movement, thereafter obtaining the image corresponding to the sequential images for creating an adequate panoramic picture. Hereinafter, the operations of panoramic photographing according to embodiments of the present invention will be described with reference to accompanying drawings.

Figure 2:
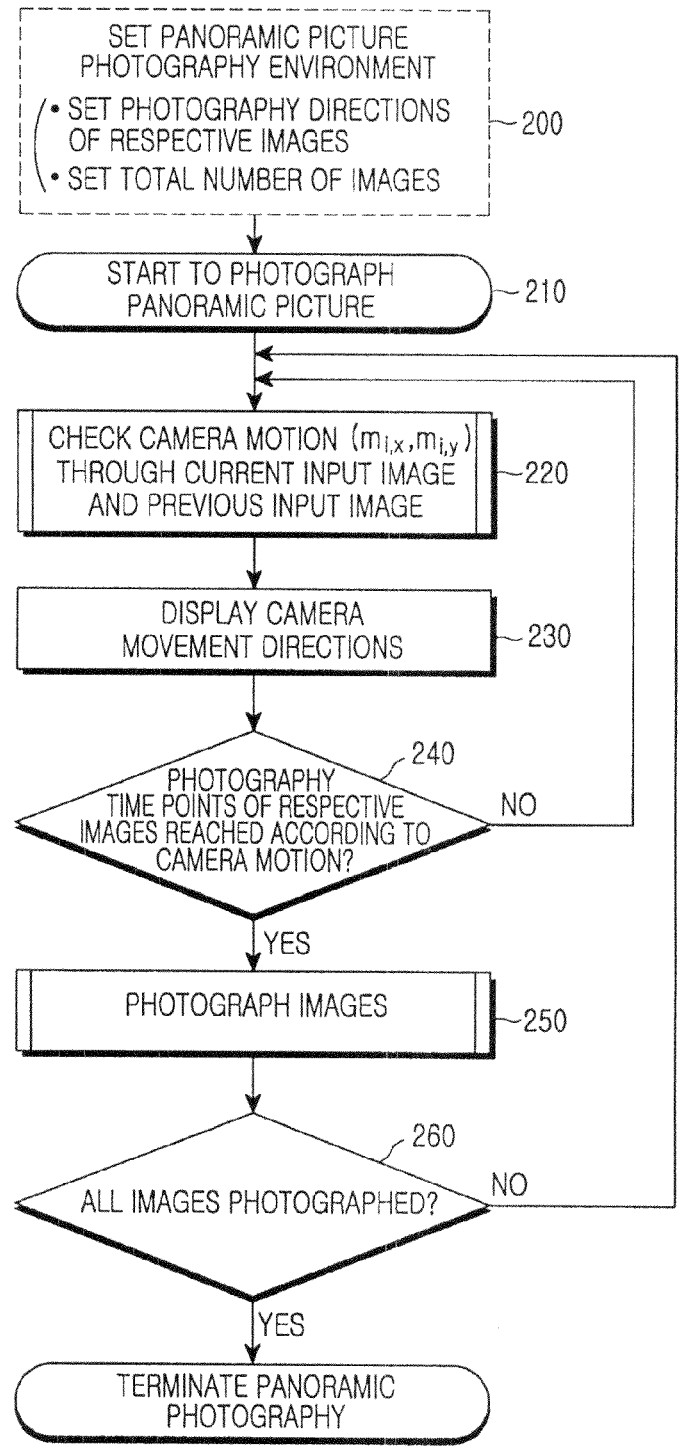
FIG. 2 is a flow diagram illustrating an operation of photographing a panoramic picture according to one exemplary embodiment of the present invention.

FIG. 2 is a flow diagram for illustrating an exemplary operation of photographing the panoramic picture according to an exemplary embodiment of the present invention. Referring to FIG. 2, various environments for photographing the panoramic picture are set in step 200, which performs prior to actual panoramic picture photography. In step 200, an interconnecting direction like the direction to the above, below, left, and right of the respective images forming the panoramic picture, i.e., a photographing direction is set. Furthermore, the number of photographing images to be inter-connected to form the panoramic picture is set.

In the operation for setting the panoramic picture photographing environment in step 200, the respective environment setting values from the user are input in selecting a sub-menu of the camera photographing menu (e.g. panoramic picture photographing environment setting mode) from among the menus for setting diverse functions provided by the conventional mobile terminal. As a matter of course, the configurations and operating programs for displaying the corresponding menus for menu selecting operation and confirming a key input to the key input unit are provided in the mobile terminal in advance from the user. In addition, some or all among respective panoramic picture photographing environment modes set by the user in step 200 may be fixed as a value adequately set by a developer to provide the user.

In step 210, a panoramic picture photographing mode is selected, from among sub-menus of the camera photographing menu in menus of the mobile terminal, and start to photograph the panoramic picture by photographing a first image of the panoramic picture. At this time, the first image of the panoramic picture is stored by a shutter input of the user, and subsequent image photography will be performed based on the panoramic picture photographing method according to an exemplary embodiment of the present invention which will be described in more detail. When the panoramic picture photography is started, an image input to the photographing apparatus in real time from the viewpoint is input and stored in the memory, and then the movement information of the photographing apparatus using the stored image is obtained.

In step 220, the movement of the photographing apparatus (i.e. a camera) is detected by using the current input image and the previous input image after receiving an image input to the photographing apparatus like a moving picture according to the following exemplary characteristic scheme of the present invention.

Preferably, the camera motion can be detected in step 220, which performs calculation of motion vectors between blocks that may be obtained, by comparing and mapping predetermined image blocks with a suitable size between the current frame and the previous frame. For example, a scheme similar to that used in the technology for motion estimation and motion compensation in encoding and decoding of the general moving pictures can make calculations of motion vectors between blocks. In the description of the present invention, a motion vector corresponding to an x axis (i.e. horizontal direction) is defined as $m_{i,x}$, and a motion vector corresponding to a y axis (i.e. vertical direction) is defined as $m_{i,y}$, wherein i indicates a sequence number of frame.

In step 230, a user is notified regarding the direction where a camera is positioned to move (i.e. camera movement direction) by means of an appropriate User Interface (UI) in order to photograph a panoramic picture according to the camera motion detected in step 220. In this case, an icon indicating the direction of movement of the camera may be currently displayed on a display unit, and thus the user can recognize the camera movement direction.

FIGS. 3A to 3E are examples of one way preview screens may look for guiding the photographing direction according to the movement direction of a photographing apparatus when photographing a panoramic picture according to one exemplary embodiment of the present invention.

The operation performed in step 230 will be described in more detail with reference to FIGS. 3A to 3E.

First, the description thereof is made on the assumption that the panoramic picture photography is being conducted from left to right, that is, photography from a first image to an $n^{th}$ image is being conducted. Additionally, it is assumed the camera is being currently conducted to photograph a second image of the panoramic picture after photographing the first image thereof.

Figure 3A:
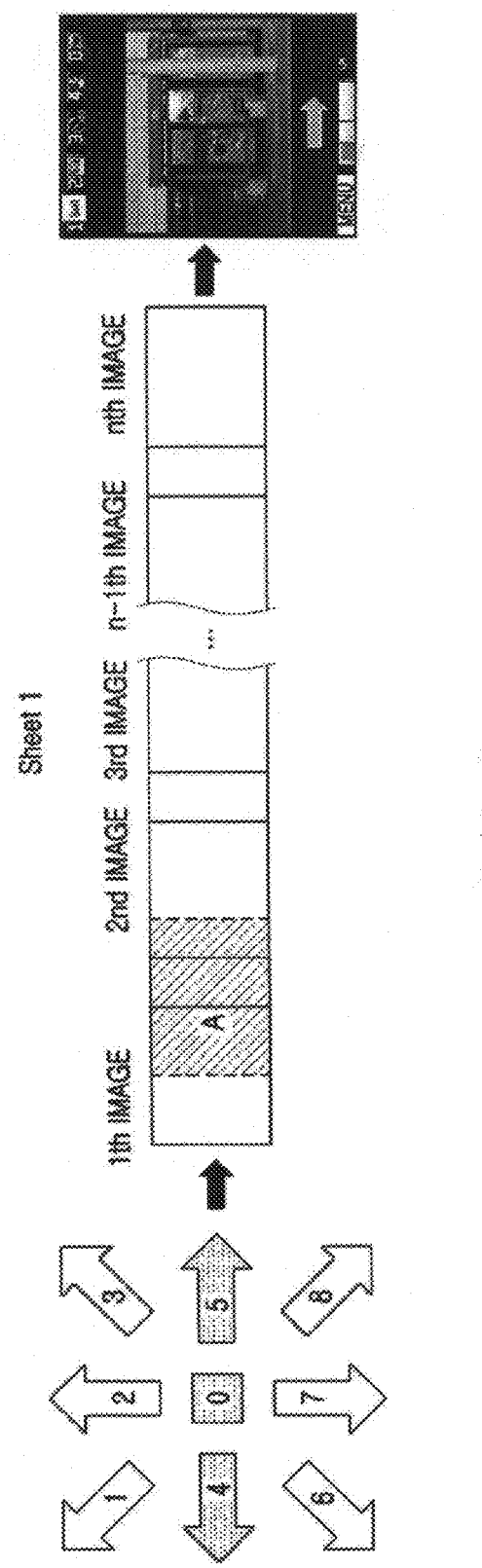
FIG. 3A to 3E are examples of preview screens for guiding the photographing direction according to the movement direction of a photographing apparatus when photographing a panoramic picture according to one exemplary embodiment of the present invention.

As shown in FIG. 3A, when the camera has image "A" projected thereon, and moves in a vertical direction without dropping out of the range of the panoramic picture photography, the camera movement is detected within a range of directions 4, 0 and 5 (leftward, stop and rightward) by the motion vector $m_{i,x}$ of the x axis. Then, in order to guide the camera movement toward a direction where the second image is located, an arrow icon in the direction of the right can be displayed on the preview screen.

Figure 3B:
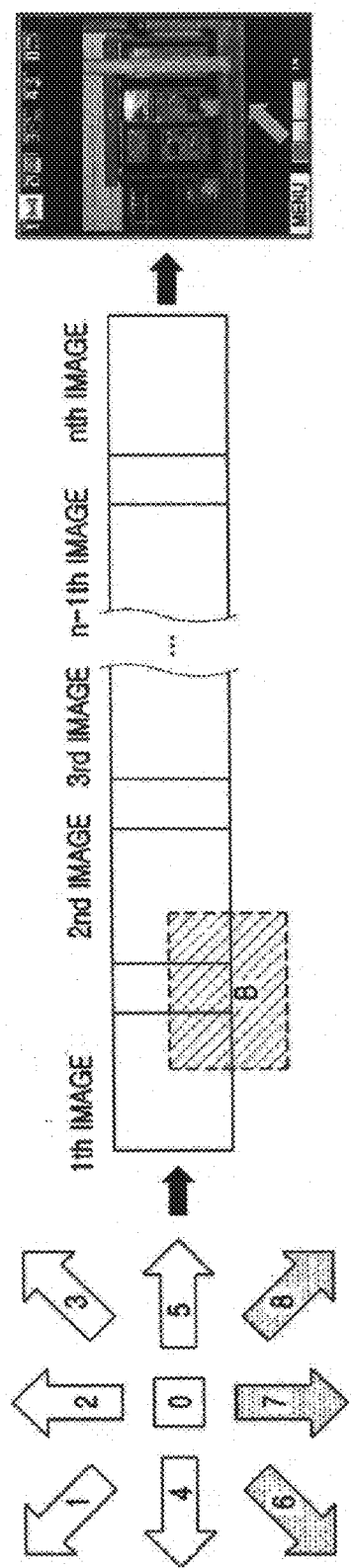
Figure 3C:
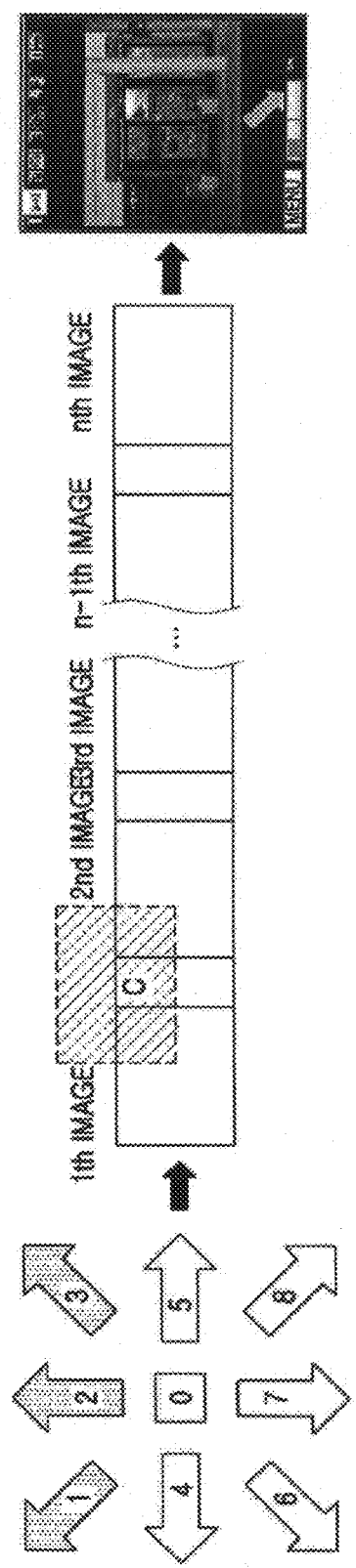

As shown in FIG. 3B, when the camera moves in a vertical-downward direction while dropping out of the range of the panoramic picture photography, and has image "B" projected thereon, it is detected that the camera moves toward Direction 6, 7 or 8 (left-downward, downward and right-downward) by the motion vector $m_{i,x}$ of the x axis and the motion vector $m_{i,y}$ of the y axis. Then, in order to guide the camera movement toward a direction where the second image is located, an arrow icon in the direction of the right-upward can be displayed on the preview screen.

Furthermore, when the camera has image "C" (FIG. 3C) projected thereon by the camera movement in the similar manner, an arrow icon in the right-downward direction can be displayed on the preview screen.

Figure 3D:
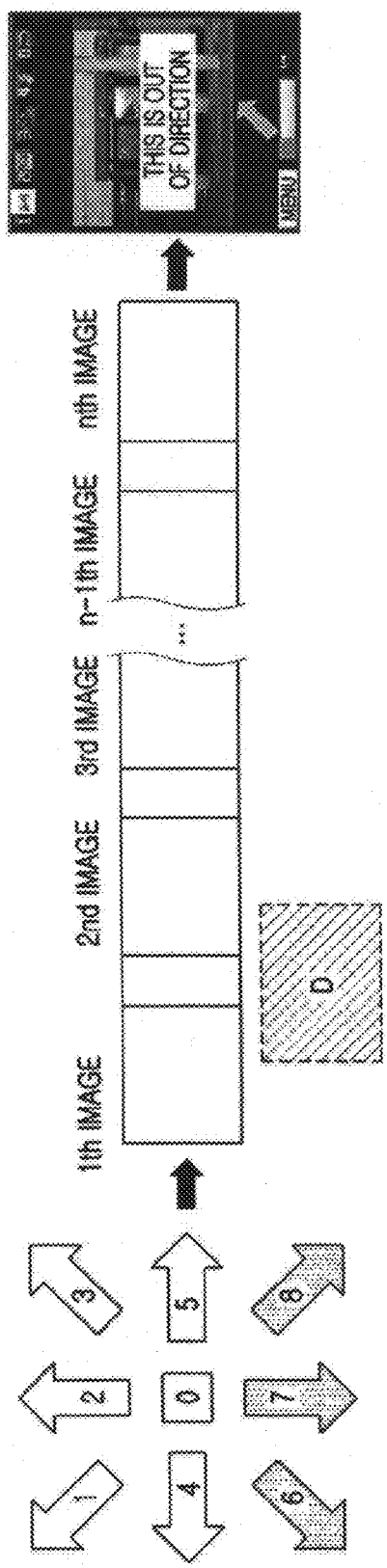

Additionally, when, as a result of the summation of the motion vector $m_{i,y}$ of the y axis, as in Equation (1), the camera is currently out of a threshold (i.e. $\tau_2$ in Equation (1)) that is preset in the upward (or downward) direction, when the current camera has image "D" projected thereon, an appropriate icon for warning it can be displayed on the preview screen (see FIG. 3D).

For example, the appropriate icon may represent both a phrase containing "this is out of the direction" and an arrow indicating the movement direction at the same time. Although the icon displayed on the preview screen is employed to notify that the camera is out of the range of the panoramic picture photography in the exemplary embodiment of the present invention, various methods for notifying the fact that the camera has deviated from the range of the panoramic picture photography to the user may be employed. For example, a method for warning it by using an external lamp or a vibrant motor equipped with the camera may be employed.

$$|\Sigma m_{i,y}| \leq \tau_2 \qquad (1)$$

Figure 3E:
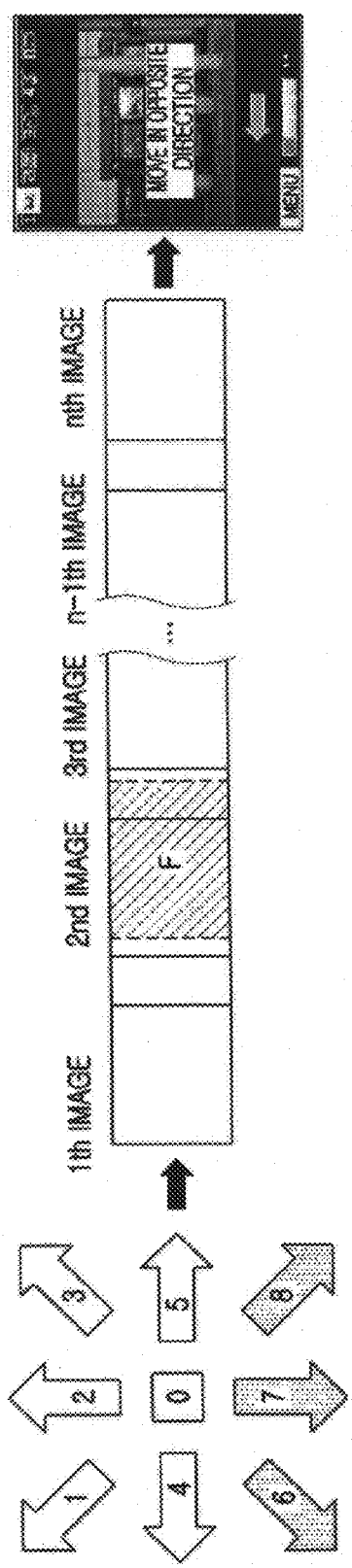

Similarly, in the case where the camera moves horizontally within the range of the panoramic picture photography while moving from the direction of the first image to the direction of the second image, when the camera exceeds the photography range of the second image, image "F" can be projected on the current camera (see FIG. 3E). In this case, the display of an appropriate icon on the preview screen (particularly, the phrase containing "move in an opposite direction" and an arrow representing a movement direction) or the warning device can be notified to the user.

In step 240, it is checked whether the photography time points of respective images are reached according to the camera motion detected in step 220. As a result of the check in step 240, when the photography time points of respective images are reached, the method proceeds to step 250. Otherwise, the method proceeds to step 220, in which the above-described steps are repeatedly performed.

For example, when the current camera photographs a panoramic picture in a direction from left to right, the motion vector $m_{i,x}$ of the x axis is accumulated as defined by Equation (2) below. Then, when the accumulated value is up to the preset threshold (i.e. $\tau_1$ in Equation (2) below), as defined by Equation 2 below, it is possible to determine that the photography time point for the current image is reached.

$$\Sigma m_{i,x} \geq \tau_1 \qquad (2)$$

In step 250, corresponding images are photographed as soon as the user presses the shutter, based on the pre-set photographing mode (e.g., panoramic picture manual photographing mode or panoramic picture automatic photographing mode). Of course, the manual or automatic panoramic picture photographing mode can be set as soon as the panoramic picture photographing environment illustrated in step 200 is set.

Further, when there has been a notification that a photography time point has been reached, the user is convenienced by reduced camera shake, and is able to move the camera slowly during photography time point, so as to acquire images with high resolution. Therefore, preferably, the fact that there is a notification that the photography position has been reached, typically by displaying the notification on the preview screen through the UI or by using an external lamp or a vibrant motor equipped with the camera.

Herein, the time point for notification regarding the reaching of the photography position can be set by using the motion vector $m_{i,x}$ of the x axis. For example, when the camera photographs a panoramic picture in a direction from left to right, respective images forming the panoramic picture are divided into 10 pieces of each of the images, a position where two ranges in the right-most position from among 10 pieces of the previous image overlap with tow ranges in the left-most position from among 10 pieces of the current photographing image is set to be a photography position. Further, the motion vector $m_{i,x}$ of the x axis corresponding to the time point can be set as a pre-set threshold for the photography position. Additionally, before the photography position is reached, a position where three ranges in a right-most position from among 10 pieces of the previous image overlap with the three ranges in a left-most position from among 10 pieces of the current photographing image can be set to be a time point notifying that the photography position has been reached, and the motion vector $m_{i,x}$ of the x axis corresponding to the time point can be set to be a pre-set threshold for notifying that the photography position has been reached. Both the pre-set threshold of the motion vector $m_{i,x}$ of the x axis defined to determine the photography position and the pre-set threshold of the motion vector $m_{i,x}$ of the x axis defined to notify that the photography position has been reached can be set when setting the panoramic picture photographing environment illustrated in step 200.

Additionally, a preferred exemplary aspect of the invention is that the notification of the photography position has been reached, in consideration of the use characteristics of the user. Habits of photographing a panoramic picture and photography patterns (e.g. camera movement speed, camera shake, movement angle, or the like) in photographing a panoramic picture may vary depending on each user. Therefore, when a user is notified that the photography position has been reached in consideration of the photography patterns of the user using the camera, the user can predict the photography position, and thus can acquire a more accurate panoramic image.

In step 250, it is identified if the number of currently photographed images is up to the total number of the pre-set images in step 200. As a result of the identification in step 250, when the number of the currently photographed images is not up to the total number of the pre-set images, step 220 is proceeded again, in which the above-described steps are repeatedly performed. In contrast, when the number of the currently photographed images is up to the total number of the pre-set images, the operation of the panoramic picture photography is terminated. When the procedure returns to step 220, the values of the motion vectors, particularly $\Sigma m_{i,x}$ of being the total sum of the motion vector mi, x of the x axis, may be reset to be an initial value of 0. Additionally, when the operation of the panoramic picture photography is terminated, one single panoramic image is created through interconnection of the respective images. In order to inter-connect the multiple images naturally, the image processing methods, such as a common image aligning, stitching and blending methods, can be applied.

A person of ordinary skill in the art can appreciate from the overall process illustrated in FIG. 2 that the user requires the photographing apparatus to move according to the photography direction in photographing a panoramic picture (e.g. direction from left to right). On the assumption that image frames are input at a regular speed and all of the frames undergo no motion blur phenomenon in the present invention, images with regularly overlaying widths are obtained automatically. Therefore, motion vectors (e.g. motion vector $m_{i,x}$ of the x axis) of input images according to the photography direction (e.g. direction from left to right) are accumulated, and thus respective images are photographed whenever accumulated value is up to the pre-set threshold $\tau_1$. When image photography is automatically set in such a manner, the user moves appropriately the photographing apparatus, so that it is possible to automatically photograph respective images forming the panoramic picture at an appropriate position (according to the threshold $\tau_1$).

Meanwhile, the photographing apparatus motion is preferably checked in step 220, which performs detection of motion vectors of image blocks between frames that may be obtained by using the current frame and the previous frame. Hereinafter, a scheme for detecting motion vectors according to the present invention will be described in more detail. The scheme for matching image blocks between frames and detecting their motion vectors may employ motion estimation technique that is used in the moving picture (typically, broadcasting image) compression technology such as the MPEG-4, and the H.264. However, a camera preview image is used in actually photographing a panoramic picture, so that the camera preview image is not particularly subjected to exposure compensation and has low correlation for each preview frame, differently from an ideal broadcasting image. Therefore, when a general motion estimation technique is employed without any modification, it is difficult to find an accurate matching block. Furthermore, the general motion estimation technique aims at effective compression, and requires more complicated calculation technique, such as motion vector detection technique for subdividing the sizes of blocks (e.g. macro block). Accordingly, the present invention provides a technique for detecting motion vectors in consideration of the specific circumstance of the panoramic picture photography.

Figure 4:
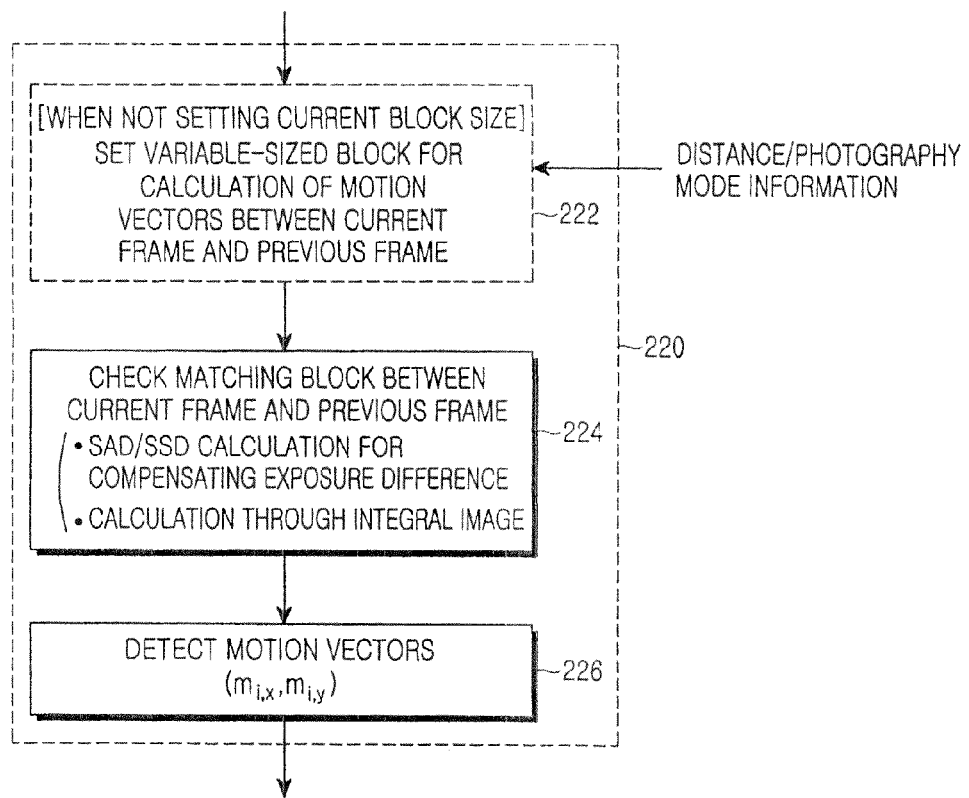
FIG. 4 is a detailed flow diagram of step 220 (the operation for detecting camera motion) in FIG. 2.

FIG. 4 is a detailed exemplary flow diagram of step 220 (the operation for checking camera motion) in FIG. 2. Hereinafter, the operation of the motion estimation of the present invention will be described in more detail with reference to FIG. 4. Referring to FIG. 4, blocks with variable sizes are set to calculate motion vectors between the current frame and the previous frame in step 222.

In the case of the motion estimation for the preview image, when a mobile camera supporting sensor and auto-stabilization with low performance conducts the motion estimation of small-sized blocks (in general, rectangular blocks with approximately 4 to 16 pixels) as in the case of the moving picture compression scheme, it is difficult to find a value of the motion vector more accurately since vector error between respective blocks is accumulated. Therefore, in one exemplary embodiment of the present invention, a scheme for finding a motion vector by using a small number of blocks (e.g. one block) with a relatively large size is employed.

Figure 5:
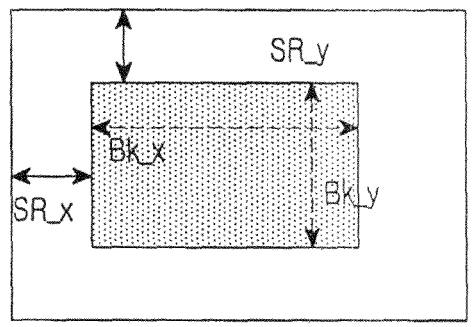
FIG. 5 is an example of image bocks with variable sizes for motion vector detection in FIG. 4.

In the aforementioned case, the size of one block is variably adjusted using preview performance of the preview device, the size of an object which the preview devices desires to photograph, and the distance from the object, and distance information for a searched space. FIG. 5 is an example of bocks set to have variable sizes in a frame. In FIG. 5, reference numeral "SR" designates a searched range, and reference numeral "BS" designates a block size.

The SR is a range for searching a block matched with the reference block within target frames to search, and the entire range of the frames may be set as the SR. However, it is possible to set an appropriate range on the basis of a location of the reference block within the target frames to the SR without utilizing the entire image of the frames. Therefore, the search of unnecessary sections such as corners of the frames is prevented in advance, so as to improve efficiency.

In one exemplary embodiment of the present invention, it is possible to variably set the BS and the SR. For example, in a case where a user photographs an object at a close distance or an object with a relatively large size, when a BS increases and the SR decreases, it is possible to acquire a motion vector more accurately. In contrast, in a case where a user photographs an object at a long distance or an object with a relatively small size, when the BS decreases and the SR increases, it is possible to acquire a motion vector more accurately.

Moreover, when the preview performance of the photographing apparatus is poor, a significant increase in the SR increases a calculation amount, and thus a significant amount of time is required to find a motion vector, which relatively decreases the frame speed. Furthermore, even if an accurate result value of the motion vector is acquired, a decrease in frame speed increases a difference between images of the frames, which results in accumulation of error. Therefore, when a motion vector is extracted from the camera preview, it is possible to recognize basic photographic information and thus set the SR according to the photography distance or the object size, by using an object detector method or by using automatic input information (e.g. a focus distance) or manual input information from a user (information on a distance or object, which may be predicted from user setting information, including a short-distance photography mode, a scenery mode, a human mode). Additionally, it is possible to set a basic block size in consideration of the calculation amount according to the preview performance of a corresponding photographing apparatus.

Still referring to FIG. 4, the operation of setting a block with a variable size in step 222 is conducted only once, only when no current block size is set (i.e. when the operation of detecting a motion vector is initially conducted), and then a block of the initially set size is used until the operation of photographing the panoramic picture is completed. This operation pertains to the distance/photography mode information.

In step 224, it is checked if there are matching blocks between current frame and previous frame by using the block with the size set in step 222. In this particular case, a scheme of finding matched blocks basically uses error information of compared pixels between respective blocks. When error between two blocks is the lowest, a corresponding block is regarded as the matching block.

The error information can be acquired by calculating an error function such as a Sum of Absolute Difference (SAD), and a Sum of Squared Difference (SSD). For example, calculation of Equation (3) below can acquire the error information. That is, the error information can be acquired, for example, by calculating the SAD and the SSD generally used in the moving picture compression technology, in step 224.

$$SAD \qquad (3)$$
$$E(m, n) = \sum_{x, y \in block} |I_1(x, y) - I_2(x+m, y+n)|$$
$$SSD$$
$$E(m, n) = \sum_{x, y \in block} \{|I_1(x, y) - I_2(x+m, y+n)|\}^2$$

In Equation (3), $I_1$ and $I_2$ represent a pixel value (i.e. brightness and a color tone) of a corresponding location within a block of each frame (i.e. previous frame, and current frame), respectively, wherein the corresponding location includes pixel locations of (x, y) for a reference block in the previous frame and pixel locations of (x+m, y+n) for searched target block in the current frame.

Ideally, the calculation of the above-described function can acquire error information between two blocks. However, in an actual photography environment, there may be an exposure difference between two neighboring frames of an image directly input from a subject. This means that it is impossible to accurately acquire error information between two blocks. Therefore, there is a need of a scheme for acquiring error information in consideration of the exposure difference. In the present invention, as defined by Equation (4) blow, use of the error function in consideration of the exposure difference makes acquisition of the error information between two blocks.

$$\text{modified } SAD \qquad (4)$$
$$E'(m, n) = \sum_{x, y \in block} |I_1(x, y) - \overline{I_1} - (I_2(x+m, y+n) - \overline{I_2}(m, n))|$$
$$\text{modified } SSD$$
$$E(m, n) = \sum_{x, y \in blcok} \{I_1(x, y) - \overline{I_1} - (I_2(x+m, y+n) - \overline{I_2}(m, n))\}^2$$

In Equation (4), $I_1$ and $I_2$ each represents an average value of pixels corresponding to blocks within each frame (i.e. previous frame and current frame).

Referring to Equation (4), a scheme for acquiring error information, as proposed in the present invention, is to perform exposure compensation by correcting each pixel value in each frame block according to the average value of the corresponding block (by subtracting the average value from each pixel value in Equation (4)).

Moreover, locations of blocks for previous frames are fixed, that is, there is one reference block, so that $I_1$ is calculated only once. However, in order to find blocks of next frames most accurately matched with blocks of previous frames, it is preferred in this case to search all blocks with the same size. Therefore, whenever each of the blocks is searched, it is preferred in this case to calculate an average value of pixels within corresponding blocks. This means that $\overline{I_2(m,n)}$ requires calculation for all blocks.

Furthermore, addition of all pixels within blocks and calculation of the average values whenever all blocks are searched requires a large amount of calculation. Therefore, the present invention proposes a scheme for reducing the calculation amount by using an integral image. Herein, the integral image refers to an image including pixels from left-upward portion of the image to its coordinates, and the integral image value refers to a value obtained by adding values of pixels constituting the integral image.

Figure 6A:
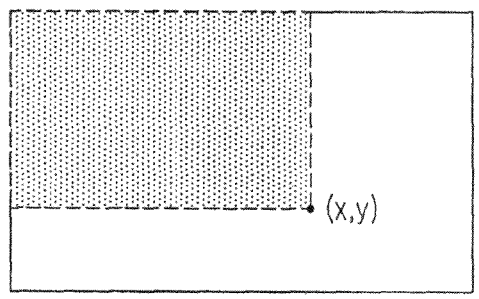
FIGS. 6A and 6B are examples of integral images.

For example, in FIG. 6A, the integral image refers to an image of a block range marked by dotted lines, and the integral image value refers to a sum total of pixels in the range. That is, $I_{int\ g}(0,0)$ represents pixel values of coordinates of 0 and 0, and the sum total of all pixels in a given image can be acquired by calculation of $I_{int\ g}$(width−1, height−1).

Figure 6B:
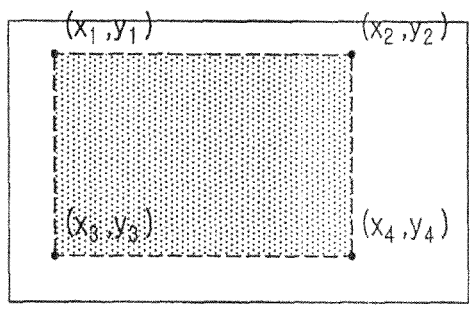

Through the integral image, it is possible to calculate a sum total of pixels within a desired range by using addition and subtraction of pixel values corresponding to 4 summits of the range. Pixel values of 4 summits, including coordinates of $(x_1, y_1)$, $(x_2, y_2)$, $(x_3, y_3)$ and $(x_4, y_4)$ are used to calculate the sum total of pixels corresponding to the block range marked by dotted lines in FIG. 6B, as defined by Equation (5) below.

$$I_{int\ g}(x_4, y_4) + I_{int\ g}(x_1, y_1) - I_{int\ g}(x_2, y_2) - I_{int\ g}(x_3, y_3) \qquad (5)$$

In an exemplary embodiment of the present invention, the integral image for the current frames is measured in advance, and then the measured image is used, so that it is possible to simply calculate average values of pixels for all blocks. This means that $\overline{I_2(m,n)}$ requires the simple calculations for all blocks.

After matched blocks between the current frames and the previous frames are checked in step 224, motion vectors (i.e. $m_{i,x}$ corresponding to a motion vector on an x axis, and $m_{i,y}$ corresponding to a motion vector on a y axis) between two blocks are acquired in step 226.

According to one exemplary embodiment of the present invention as described above, it is possible to conduct the operation of photographing a panoramic picture. Although a preferred exemplary embodiment of the present invention has been described for illustrative purposes, those skilled in the art will appreciate that various modifications, additions and substitutions are possible, without departing from the scope and spirit of the claimed invention.

For example, a method for finding a motion vector for a plane image can be used in finding a motion vector. This provides high resolution just in case of compressed images or broadcasting images. However, in the case of acquiring motion vector information for panoramic picture photography, it is necessary to consider the fact that the acquisition of motion vectors is aimed at acquiring a more accurate panoramic picture image.

According to another exemplary embodiment of the present invention, a panoramic picture may be photographed, and then respective images may be pre-projected on a mosaic plane and curved surface. This operation is used because successive images obtained to make a panoramic picture have a structure of a cylinder while the direction of the camera is circularized. Therefore, in another exemplary embodiment of the present invention, an input image is projected on an appropriate projection surface (e.g. cylindrical surface) and a motion vector for the projected image is found considering that the image curvedly moves instead of the image moving on the basis of a plane, thereby acquiring a motion vector more accurately.

In addition, a motion vector can be acquired by using a frame skip considering preview speed characteristics of a preview device. In particular, vector information of each frame is generally crucial to the moving picture compression, so that motion estimation is conducted every frame. However, information of every frame is not crucial to the operation of the motion estimation for panoramic picture photography according to the present invention. Therefore, in another exemplary embodiment of the present invention, it is possible to perform motion estimation while skipping frames (e.g. about 1 frame or 2 frames) according to circumstances. In this case, it is possible to reduce calculation time and calculation amount as much as the skipped frames, so that wider SR can be acquired by the amount of the reduced time. Besides, it is possible to calculate a motion vector more accurately.

Figure 7:
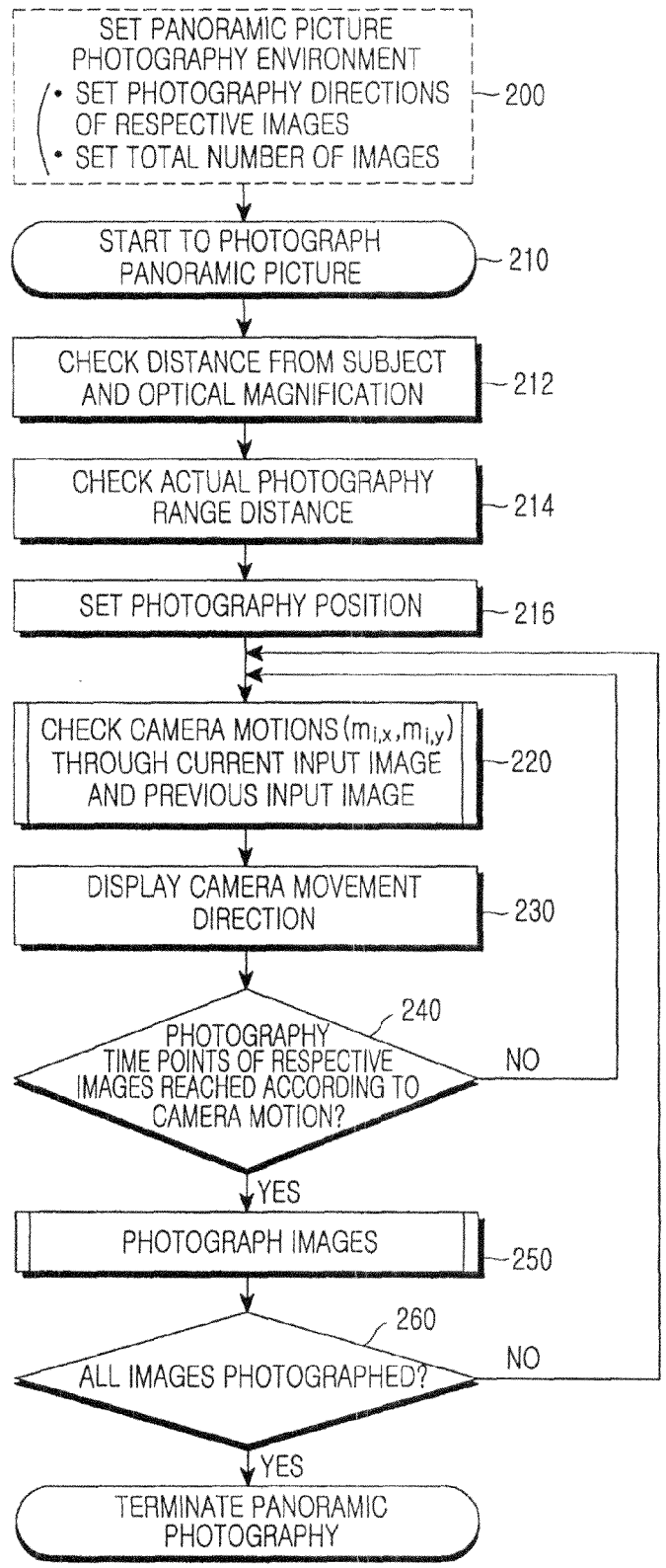
FIG. 7 is a flow diagram illustrating an operation for photographing a panoramic picture according to another exemplary embodiment of the present invention.

FIG. 7 illustrates an exemplary flow diagram of the operation for photographing a panoramic picture according to another exemplary embodiment of the present invention.

Referring to FIG. 7, the method for photographing a panoramic picture according to another exemplary embodiment of the present invention is identical to the above-described method for photographing a panoramic picture according to one possible exemplary embodiment of the present invention. However, the method for photographing a panoramic picture according to another exemplary embodiment of the present invention further includes steps of 212, 214, and 216 after step 210. In FIG. 7, steps similar to those of FIG. 2 are numbered by reference numerals identical to those of FIG. 2, and the detailed description thereof will be omitted.

Figure 8:
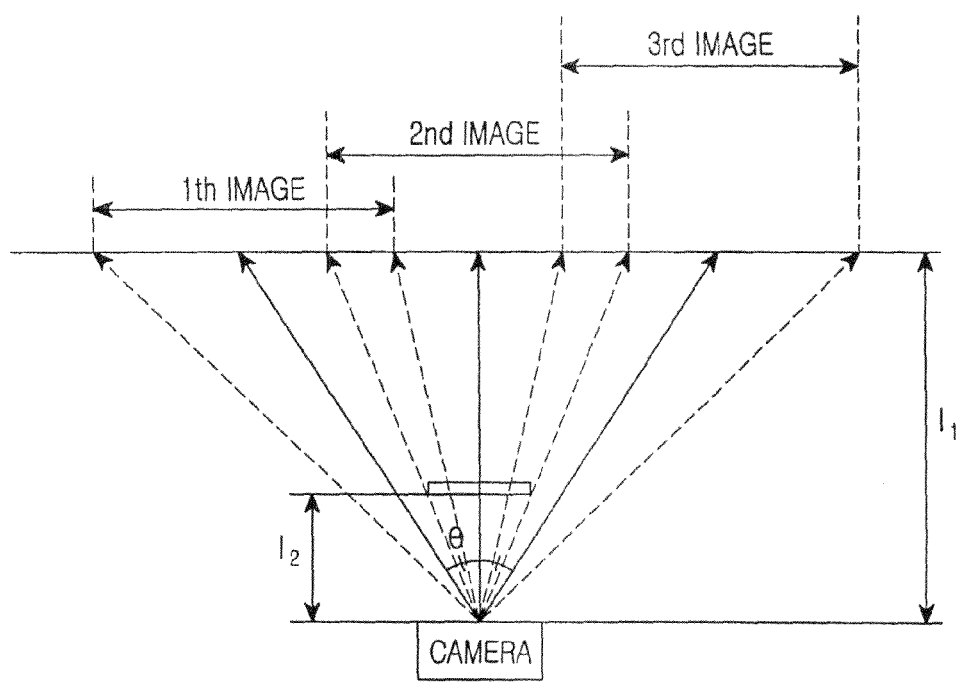
FIG. 8 is an example of camera movement states according to a panoramic photography and the relationship between a camera and a subject.

FIG. 8 is an example of camera movement states according to panoramic picture photography. Referring to FIG. 8, the panoramic picture is finally creased by sequentially acquiring images (i.e. second image and third image) rotated about a first image by a predetermined rotation angle θ and combining the acquired images each other. In the present invention, how much the camera moves between photographed images is one important factor in determining a moment at which a panoramic picture is photographed. Herein, the factor is checked through a sum total of motion vectors. Additionally, in order to photograph a panoramic picture more accurately, a distance at which the image is actually photographed (hereinafter, actual photography range distance $I_2$) is another important factor. Herein, the actual photography range distance $I_2$ is a virtual distance enough to recognize the image acquired by a lens.

When images obtained by rotating them at the actual photography range distance $I_2$ of being a relatively close distance (e.g. distance of 1 m or shorter) by a predetermined rotation angle (e.g. 10 degrees) are compared with images obtained by rotating them at an actual photography range distance $I_2$ of being the relatively long distance (e.g. distance of 3 m or longer) by the same rotation angle (e.g. 10 degrees), the image acquired at the actual photography range distance $I_2$ of being the relatively close distance has relatively smaller motion vectors than the image obtained at an actual photography range distance $I_2$ of being the relatively long distance.

In order to form an optimal panoramic picture, photographing respective images to overlap by predetermined portions is more important than an absolute size for a motion degree, so that it is necessary to adjust a moment to photograph a subject at the actual photography range distance $I_2$. That is, it is necessary to guarantee overlapping sections between interconnection images.

Therefore, it is preferred that, in the case of photographing the panoramic picture at a relatively close distance of the actual photography range distance $I_2$, as in the case of a human panoramic picture, a panoramic picture is photographed at a moment where the sum total of motion vectors becomes relatively small. In contrast, it is preferred that, in the case of photographing a panoramic picture at a relatively long distance of the actual photography range distance $I_2$, as in the case of a scenery panoramic picture, the panoramic picture is photographed at a moment where the sum total of motion vectors becomes relatively large.

With reference to FIG. 7, in another exemplary embodiment of the present invention, there is disclosed a method for photographing a panoramic picture in consideration of the actual photography range distance $I_2$.

First, a panoramic picture starts to be photographed in steps 200 and 210. In this case, optical magnification and a distance $I_1$ from a subject resulting from photographing a first image of a panoramic picture as well as information of the first image (e.g. color tone and brightness of respective pixel forming the image) are stored in a memory in step 210.

In step 212, a task to refer to the memory is performed to check image photography information including the distance from the subject $I_1$ and the optical magnification obtained in step 210. In step 214, the image photography information checked in step 212 is used to identify an actual photography range distance $I_2$ of the image. The actual photography range distance $I_2$ of the image can be calculated through the relationship between the distance $I_1$ from the subject and the optical magnification. For example, the actual photography range distance $I_2$ of the image may correspond to a value obtained by dividing distance $I_1$ from the subject by the optical magnification used for image photography.

In step 216, a photography time point of multiple images in the panoramic picture is determined in consideration of the actual photography range distance $I_2$ checked in step 214. In step 240, a motion vector $m_{i,x}$ on the x axis is accumulated and, when the accumulated value is up to the pre-set threshold, it is determined that the photography time point is reached, so that it is possible to photograph the images of the panoramic picture. That is, step 216 is performed to set the pre-set threshold so that overlapping ranges of respective images are appropriately set with regard to the actual photography range distance $I_2$. As described above, when a panoramic picture is photographed at a relatively close distance, as in the case of the human photography image, the pre-set threshold for determining the photography position is set to have a relatively small value. In contrast, when a panoramic picture is photographed at a relatively long distance, as in the case of the scenery panoramic image, the pre-set threshold is set to have a relatively large value.

Preferably, the pre-set threshold is further set to notify that the photography position has been reached, in step 216. The pre-set threshold for notifying that the photography position has been reached may be set to have a relatively smaller value than the pre-set threshold for determining the photography position. For example, the pre-set threshold for notifying that the photography position has been reached may have a size of about 80% of the pre-set threshold for determining the photography position. The size of the pre-set threshold for determining the photography position has been described only for one example of this exemplary embodiment, and does not limit the present invention to any exemplary threshold in the above description.

Moreover, although the above-description has been made with the assumption that the photographing apparatus according to the present invention is moved by a user in photographing a panoramic picture, even when the photographing apparatus is mounted on a separate movable device such that it can automatically move, the present invention can be also applied without any modification. Furthermore, although the above description has been made with the example where a camera photographs a panoramic picture in a horizontal direction or a vertical direction in photographing the panoramic picture, the present invention can be also applied to the case where the camera photographs a panoramic picture in a horizontal direction or a vertical direction in a mixed manner (i.e. the case where a plurality of images constituting the panoramic picture are horizontally or vertically aligned to have a mosaic array). It is noted that various types of UIs except for the above-described UIs may be expressed in various manners.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for photographing a panoramic picture by a photographing apparatus of a mobile terminal, the method comprising the steps of:
    (a) checking, by a controller, a motion of a corresponding photographing apparatus by comparing currently input images and previously input images in real time by employing a motion estimation technique employing exposure compensation to correlate matched image blocks using error information of compared pixels between respective image blocks recognize the motion of image blocks between previous frames and current frames of the input image in a predetermined range when respective images constituting a panoramic picture are photographed;
    (b) checking, by the controller, image photography information including a focus distance and an optical magnification for calculating an actual photography range distance of the respective images of the subject, and setting a pre-set threshold comprising an accumulated value of motion vectors determined by the motion estimation technique in consideration of the calculated actual photography range distance of the respective images;
    (c) confirming, by the controller, whether the checked motion in step (a) reaches the pre-set threshold, and the controller determining photography time points at which each of the respective images are photographed each time the preset-threshold is reached; and
    (d) photographing, by an image capture unit, the respective images according to a manual mode or an automatic mode at each photography time point of the determined photography time points of the respective images.

2. The method as claimed in claim 1, wherein the motion estimation technique comprises the controller calculating motion vectors between image blocks of a plurality of image blocks of the respective images, said image blocks being matched based on error information between respective pixels compared among the plurality of image blocks of frames, correcting the respective pixels in the image blocks according to an average value of a corresponding image block, and employing the exposure compensation.

3. The method as claimed in claim 2, wherein the error information is acquired by calculation, by the controller, of a Sum of Squared Difference (SSD) or a Sum of Absolute Difference (SAD) defined by following equations, $$\text{modified } SAD$$
$$E(m,n) = \sum_{x,y \in block} |I_1(x,y) - \bar{I}_1 - (I_2(x+m, y+n) - \bar{I}_2(m,n))|$$

$$\text{modified } SSD$$
$$E(m,n) = \sum_{x,y \in block} \{I_1(x,y) - \bar{I}_1 - (I_2(x+m, y+n) - \bar{I}_2(m,n))\}^2,$$

where, $I_1$ and $I_2$ are pixel values of (x, y) and (x+m, y+n) in the image blocks within the current frame and the previous frame, respectively, and $\bar{I}_1$ and $\bar{I}_2$ are average values of pixels corresponding to image blocks within the previous frame and the current frame, respectively.

4. The method as claimed in claim 3, wherein, when the average values of the pixel corresponding to image blocks are calculated, an integral image for the current frame is set in advance, and average values of the respective image blocks are calculated by using the integral image.

5. The method as claimed in claim 3, wherein the pixel value corresponds to brightness or respective color tones.

6. The method as claimed in one claim 2, wherein, when motion vectors between the image blocks are calculated, a single block search scheme is used.

7. The method as claimed in claim 2, wherein an image block of the plurality of images blocks is variably set according to one or at least two of preview performance, a distance from the subject, and photography mode information.

8. The method as claimed in claim 7, wherein, when the image blocks matched with the image blocks are searched, a Search Range is variably set.

9. The method as claimed in claim 2, wherein the frames are subjected to the motion estimation by projecting the frames on a pre-set panoramic projection space in advance.

10. The method as claimed in claim 2, wherein, when the frames are compared, said frames are skipped in a pre-set manner.

11. The method as claimed in claim 1, wherein, in the step of checking the motion of the photographing apparatus, comprising recognizing a direction toward which the photographing apparatus is moved, and guiding the photographing apparatus to move from the recognized direction to a pre-set panoramic picture photography direction by using a guiding device.

12. The method as claimed in claim 11, wherein the guiding device corresponds to a User Interface (UI) on which a guiding direction is displayed by a display.

13. The method as claimed in claim 11, wherein the guiding device includes a vibrant motor for operating at the pre-set panoramic image photography position.

14. The method as claimed in claim 1, wherein the pre-set threshold corresponds to a value indicating a time point for photographing respective images and/or a time point when a photography time point is reached.

15. The method as claimed in claim 13, wherein the pre-set threshold corresponds to a value indicating a time point for photographing respective images and/or a time point when a photography time point is reached.

16. The method as claimed in claim 14, wherein the pre-set threshold for indicating the time point when the photography time point is reached is set by reflecting photography patterns including a camera movement speed, a rotation angle, and a degree where the camera is shaken while photographing a panoramic picture.

17. The method as claimed in claim 1, wherein the accumulated value of motion vectors comprises at least one of motion vectors on an x axis ($m_{i,x}$) and motion vectors on a y axis ($m_{i,y}$).

* * * * *

UNITED STATES PATENT AND TRADEMARK OFFICE
CERTIFICATE OF CORRECTION

| | |
|---|---|
| PATENT NO. | : 8,330,797 B2 |
| APPLICATION NO. | : 12/231077 |
| DATED | : December 11, 2012 |
| INVENTOR(S) | : Soo-Kyun Kim et al. |

It is certified that error appears in the above-identified patent and that said Letters Patent is hereby corrected as shown below:

In the Claims:

Column 16, Claim 6, Line 54 should read as follows:
--...as claimed in claim 2, wherein...--

Signed and Sealed this
Fourteenth Day of May, 2013

Teresa Stanek Rea
*Acting Director of the United States Patent and Trademark Office*